United States Patent [19]

Marks

[11] 3,816,239
[45] June 11, 1974

[54] RECOVERY OF TERPENES
[75] Inventor: Robert Elliott Marks, Jacksonville, Fla.
[73] Assignee: Envirotech Corporation, Salt Lake City, Utah
[22] Filed: Mar. 12, 1971
[21] Appl. No.: 123,549

[52] U.S. Cl. .................. 162/15, 159/47 R, 162/29, 162/239
[51] Int. Cl. ............................. D21c 11/06
[58] Field of Search ..................... 162/15, 29, 239; 260/675.5, 236.6; 99/140; 159/47 R, 47 WL

[56] References Cited
UNITED STATES PATENTS
3,347,681  10/1967  Platt ............................... 260/236.6

Primary Examiner—S. Leon Bashore
Assistant Examiner—Richard V. Fisher
Attorney, Agent, or Firm—Robert R. Finch

[57] ABSTRACT

Disclosed is a method for recovering terpenes from a wet, gaseous stream containing terpene vapor and water vapor by condensing water from the stream by indirect heat exchange to produce an aqueous liquid terpene-lean condensate phase while leaving a first terpene-rich vapor phase. The aqueous terpene-lean condensate is disengaged from said vapor phase, subcooled and used as the indirect heat exchange medium at boiling for condensing additional terpene-lean condensate from the wet, gaseous stream. During this indirect heat exchange, a portion of the terpene-lean condensate is flash vaporized; and these distillate vapors are combined with the first terpene-rich vapor phase for recovery of terpenes therefrom by condensation at a temperature below the dew point temperature of the terpene component.

2 Claims, 2 Drawing Figures

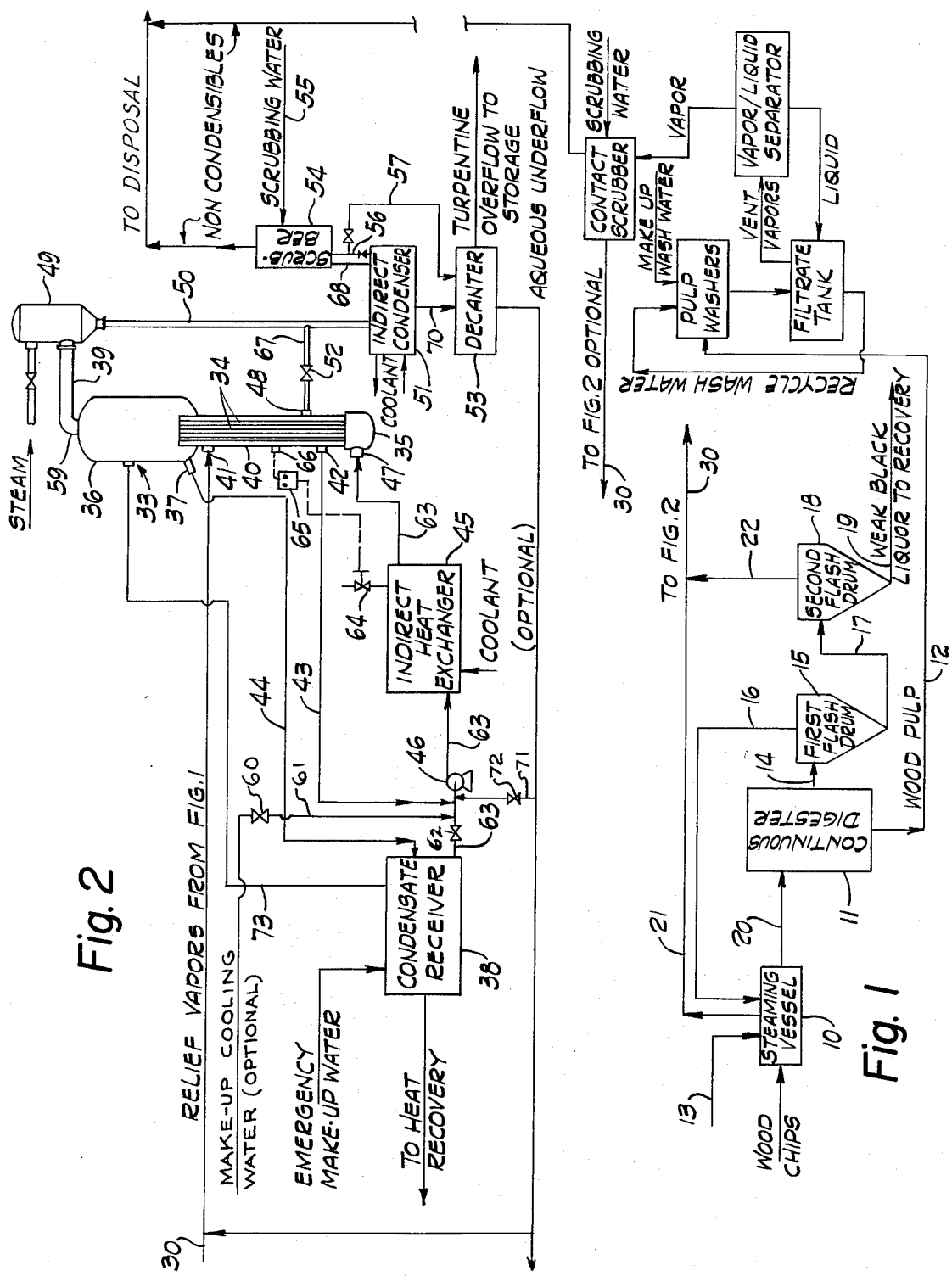

RECOVERY OF TERPENES

This invention pertains to the recovery of terpenes from wet, gaseous streams containing terpene vapor and water vapor, with or without noncondensible gases such as air, mercaptans and sulfides. More particularly, this invention relates to the recovery of terpenes from wet, gaseous streams containing terpenes in such low concentrations that the terpenes cannot be economically recovered from the stream by conventional condensation and decantation methods.

As used herein, the term "terpenes" refers to the volatile, normally liquid, water-immiscible, naturally occurring, acyclic, and cyclic substances comprising at least about 70 percent by weight $C_{10}H_{16}$ hydrocarbons derived from vegetative source materials, primarily coniferous trees and citrus fruit rinds; but also including to a lesser extent other vegetable sources such as grasses, weeds, hay, plant leaves and organic wastes therefrom. The terpenes derived from the woodpulping of trees are known as turpentine; and the terpenes derived from citrus fruit rinds comprises in excess of 90 percent by weight of limonene, and hence are known as citrus limonene.

In one aspect, the invention relates to the recovery of turpentine from relief gases generated during the digestion of wood to woodpulp in an alkaline cooking liquor. This aspect of the invention provides an excellent method for controlling pollution of the atmosphere and water within the vicinity of woodpulping mills.

In another aspect, this invention relates to the recovery of citrus limonene as a by-product of citrus juice extraction processes. This aspect also provides for environmental pollution abatement.

In another aspect, this invention relates to recovery of terpenes from vaporous emission from the drying of lumber, woodchips, plywood, particle board, chipboard and related cellulosic materials which are air or kiln dried for construction use.

In the woodpulping process, a digester vessel is charged with woodchips and an alkaline solution of cooking liquor. The woodchips can be charged on a batch basis or continuously as in the commercial woodpulping process known as the "Kamyr" process. In either batch or continuous process, the woodchips are digested at elevated temperatures (e.g., 340° to 355°F.) and pressures (e.g., 100 to 180 psig) to produce fibrous woodpulp and relief vapors containing water, turpentine and other valuable chemicals. Additionally, the relief vapors contain air, mercaptans, sulfides and other noncondensible components. Relief vapors can be withdrawn from the digester, the filtrate tank which receives the pulp washings, the cooking liquor flash tanks and the steaming vessels.

It is conventional to recover turpentine from these relief vapors by a condensation technique when the vapor stream contains sufficient turpentine to allow the formation of immiscible turpentine and water condensate phases. It is well known that turpentine and water are immiscible, and the turpentine phase has a lower density in the water phase. Thus, liquid turpentine and liquid water phases can be separated by density differential by gravity (decantation) or assisted gravity (centrifugation). One such technique is described in copending application Ser. No. 751,425 filed Aug. 9, 1968, now U.S. Pat. 3,607,617 issued Sept. 21, 1971 the disclosure of which is incorporated by reference.

This technique is satisfactory when the vaporous stream being condensed contains turpentine in sufficient concentration so that two liquid condensate phases form. Desirably, the water-to-turpentine weight ratio in the condensate is as low as possible (e.g., 50:1 or even 20:1 and lower) to minimize carryover and solubility losses of turpentine in the aqueous phase. When the vaporous stream being condensed contains very low concentrations of turpentine with respect to water (e.g., water-to-turpentine weight ratios in the neighborhood of 100:1 or 200:1), it is impractical if not impossible to condense the vapor to form a two-phase condensate from which turpentine can be economically recovered. This is because as the concentration of the turpentine decreases, the dew point temperature of the turpentine component also decreases; and thus it becomes necessary to have very low condensation temperatures to effectively condense out liquid turpentine. Such low temperatures are not usually obtainable by heat exchange with available cooling water at temperatures in the range of 60° to 90°F. Furthermore, even if low temperatures could be achieved through refrigeration, the condensate would have a very high water-to-turpentine ratio (e.g., 500:1) which hinders effective turpentine recovery by decantation or centrifugation. The present invention provides an efficient method of recovering terpene from a wet, gaseous stream containing turpentine and other terpenes in the proportion of 50 parts to 500 parts by weight of water per part of terpene.

In the past, attempts have been made to increase the turpentine concentration in the high pressure blow steam from a woodpulp digester by conducting the condensation in two stages. In the first stage, the total pressure is maintained between 110 psig and 6 psig while the condensation temperature is maintained above the dew point temperature of the turpentine component in order to condense out only water. This first stage condensation thus has the effect of increasing the turpentine-to-water ratio in the residual vapor phase by removing a substantial portion of the water vapor as condensate. A second stage condensation at a pressure below 6 psig is then carried out on the residual vapor phase at a temperature below the dew point of turpentine component to form a two-phase condensate containing turpentine and water in a suitable ratio for decantation.

This method is described in U.S. Pat. No. 3,492,198 which proposes venting the relief gases and blow steam from a batch digester into a blow tank where they are mixed. The mixture in the blow tank is then blown to a direct contact condenser where the main part is condensed by direct contact with cooling water while the pressure drops from 110 psig to about 6 psig. The uncondensed vapors are then sent to an indirect condenser where turpentine and water are condensed out, and the turpentine is recovered by decantation. This method utilizes a direct contact condensation or "scrubbing" of the water vapor from the turpentine/water vapor mixture during the first stage, and thus equilibrium concentrations of dissolved turpentine will be removed in the large volume of "scrubbing" water. By this direct contact condensation, the relatively large volume of scrubbing water becomes saturated with turpentine; and thus a significant proportion of turpentine is removed from the system with the scrubbing water. Furthermore, while the dew point temperature of the water vapor/turpentine vapor is initially quite low, the dew point temperature of the residual vapor phase increases as concentration of the turpentine increases upon condensation of water vapor. Thus, near the end of the condensation, unrecoverable amounts of turpentine will begin to condense. Furthermore, when batches are intermittently blown, the temperature in the scrubbing water varies because steady state equilibrium is not maintained as the heat input and heat output vary with time. This results in unrecoverable turpentine losses.

Another such method is disclosed in the article, "Turpentine Recovery for Continuous Digesters," by L. B. Jansson, appearing in the TAPPI Journal, Volume 50, Number 4, of April, 1967, which theorizes that the turpentine is stripped from black liquor during the multiple effect evaporation process and proposes venting the steam chest of each effect to a common vent line which discharges into a direct contact condenser where vapors are condensed for recovery by direct contact with an aqueous sodium hydroxide solution. The condenser is vented in parallel to the steam jet ejector system evacuating the vapor dome of the last evaporation effect.

This system often results in very low yield of turpentine. Such low yields of turpentine are due to several factors. First of all, the condenser is operated at a very low pressure as it vents directly to the steam jet ejector system at about 1 to 2 psia and lower. Under these low pressures, the temperature of saturated steam is about 100° to 130°F.; and the dew point temperature of turpentine is much lower than the temperature of saturated steam. Thus, very low temperatures will be required to condense any turpentine from the vapor phase at this pressure. The achievement of such low temperature is impractical, if not impossible with cooling water which is typically 60° to 90°F. Moreover, this article proposes the use of a direct condenser wherein the cooling liquid is in direct contact with the vapors being condensed. This adds a significant volume of water to any liquid turpentine that may be condensed and thereby increases the volume of water that must be removed during the phase separation portion of the recovery. This increases solubility and carryover losses of turpentine in the aqueous underflow phase. Furthermore, the direct condensing liquid is a caustic solution which acts as an emulsifying agent in forming interphase emulsions between any condensed turpentine and water.

A similar problem is present in the recovery of citrus limonene from wet, gaseous citrus limonene containing streams derived from citrus fruit juice extraction processes. In the citrus juice extraction process, fruit such as oranges, tangerines, grapefruits, limes and lemons are mechanically squeezed or reamed to extract juice therefrom. As a by-product of this juice extraction process, a significant proportion of citrus limonene is removed from the citrus peel in an aqueous dispersion.

For instance, during the extraction of juice from the fruit in the extractor, the peel is flushed with water to form a peel oil/water emulsion from which peel oil can be separated in a centrifugal separator to yield an oil overflow phase known as cold press oil. Unfortunately, a great deal of peel oil is lost as peel oil/water emulsion in the aqueous underflow phase from the centrifugal separator.

Another source of peel oil is the peel itself. After extraction of the juice, the wet peel is treated with lime, disintegrated in a hammer mill and pressed to produce "pressed peel" and an aqueous dispersion known as peel liquor. The streams (i.e., the peel oil/water emulsion and/or the peel liquor) can be completely or partially flash vaporized to form wet, gaseous streams from which terpenes can be recovered by the present invention.

Furthermore, when the pressed citrus peels are dried with hot gas such as hot air or combustion gases or superheated water vapor in a direct contact drier, the vent gases from the drier contain citrus limonene and water vapor. In the past, the recovery of citrus limonene from these dilute liquid and vapor streams has been inefficient or nonexistent in the citrus industry.

In accordance with one feature of this invention, terpenes including turpentine and citrus limonene are recovered from wet, gaseous streams (such as relief gases evolved during the chemical digestion of wood to woodpulp or the wet, gaseous citrus limonene containing streams discussed above) by condensing said wet, gaseous stream in the condensing vapor zone of an indirect flash evaporator to condense a terpene-lean aqueous condensate fraction while leaving terpene-rich vapor fraction. The aqueous condensate fraction is withdrawn from the condensing vapor zone, and at least a portion thereof is subcooled. The subcooled aqueous condensate is then passed to the boiling liquid zone of said flash evaporator where a fraction thereof is boiled by heat exchange in condensing said wet, gaseous stream. The boiling liquid zone of the flash evaporator includes the actual indirect heat transfer surface as well as the vapor dome to include boiling in the vapor dome. Therefore boiling can take place in the vapor dome as well as at the indirect heat exchange surfaces. The distillate vapors resulting from the boiling are rich in terpenes in accordance with the laws of distillation. The distillate vapors and the terpene-rich vapor fraction are condensed at a temperature low enough to yield immiscible terpene and aqueous phases from which terpenes are recovered by density differential.

Preferably, the immiscible condensate phases are separated at a temperature ranging from 125°F. to the boiling point of the combined phases and more preferably at 140° to 200°F. to optimize terpene recovery in accordance with the disclosure of U.S. Pat. No. 3,607,617.

Alternatively, the immiscible condensate phases can be separated by any conventional method for separating immiscible liquid such as liquid-liquid extraction, electrical discharge phase agglomeration as shown in U.S. Pat. No. 3,356,603 (the teaching of which is incorporated by reference), steam distillation, reverse osmosis, ultrafiltration, preferential adsorption or absorption of one of the liquid phases on a sorption medium phase coalesced by surface tension and so on.

The flash evaporator employed is of the heated surface type wherein heat is transferred from a condensing vapor zone at a given pressure through the heated surface to a boiling liquid zone maintained at a pressure lower than the pressure in the condensing vapor zone. The vapors are produced in the boiling liquid zone and are removed by a suitable vacuum pump such as a Venturi-type steam jet ejector or mechanical vacuum pump. Thus, evaporation is accomplished by transferring heat from the condensing vapor zone to the boiling liquid zone while maintaining the pressure in the condensing vapor zone to cause a corresponding decrease in the boiling point of the liquor in the boiling liquid zone.

Usually, the pressure in the condensing vapor zone is greater than the atmospheric pressure and is usually in the range of 15 to 45 psia depending upon the pressure at which the wet, gaseous stream is being fed to the flash evaporators. The pressure in the condensing vapor zone is maintained to facilitate the partial condensation of the water vapor from the gaseous stream.

The pressure in the boiling liquid zone is maintained lower than the pressure in the condensing vapor zone so as to lower the boiling point temperature of the liquid and thus provide for temperature gradient for heat transfer from the condensing vapor zone to he boiling liquid zone. Usually the pressure in the boiling liquid zone is maintained sufficiently below the pressure in the condensing vapor zone to cause a temperature differential at least about 10°F. and preferably at least 20°F. between the temperature of the condensing vapor and the boiling liquid for efficient heat transfer. This usually corresponds to a pressure gradient of at least about 2 psi depending upon the actual pressures involved.

The condensation temperature in the condensing vapor zone of the flash evaporator depends upon the pressure and is selected to condense water at the expense of the terpene component. The temperature can be above or below the dew point temperature of the terpene component to condense said terpene-lean aqueous condensate fraction. The term "dew point temperature" is used herein in its conventional sense and refers to the temperature at which the vapor phase becomes saturated with a given component at the prevailing pressure and is the temperature at which the partial pressure of the component in the vapor phase equals the vapor pressure. In theory, if the temperature in all places in the condensing vapor zone were maintained above the dew point temperature of the terpene component, none of the terpene component would condense. As a practical matter, however, as the vapors become more concentrate in turpentine as water vapor is condensed, the dew point temperature increases; and turpentine will begin to condense. For instance, in the recovery of turpentine from the relief vapors of a woodpulp digester, turpentine is observed to condense at 100°F. when the water-to-turpentine ratio in the vapor phase reaches about 10 to 1.

In any event, the major portion of terpenes present in the condensing vapor zone does not condense because the condensing temperature at the prevailing condensation pressure is above the dew point temperature of the terpene component for most of the condensation and only water vapor condense. The major proportion of the turpentine remains in the form of uncondensed vapors.

Accordingly, the residual vapors from the condensing vapor zone are enriched in terpenes (e.g., 5 to 10 percent by weight of terpenes with the balance being water vapor, air and noncondensible gases). The terpenes are then recovered by condensing the residual vapors from the condensing vapor zone by indirect heat exchange below the dew point temperature of the terpene component to produce a two-phase condensate from which the terpenes can be recovered by decantation or centrifugation. Raising the pressure on the vapors from the condensing vapor zone raises the dew point temperature of the terpene component and thus makes it possible to condense terpenes at a higher temperature as by indirect heat exchange with cooling water at 60° to 90°F.

The aqueous terpene-lean condensate fraction containing a small concentration of terpenes which condense as the vapors become enriched in terpenes as a result of the condensation of water is subcooled by further indirect heat exchange. At least a portion and preferably all of the subcooled aqueous condensate then passes to the boiling liquid zone of the flash evaporator where the aqueous condensate is flash vaporized to yield terpene-rich distillate vapors and terpene-lean liquid distilland by indirect heat exchange with the incoming wet, gaseous terpene-containing stream in the condensing vapor zone. The aqueous terpene-lean condensate is subcooled before passing to the boiling liquid zone to remove heat so that the condensate can efficiently receive heat from the condensing vapor zone. The degree of subcooling of the terpene-lean aqueous condensate can be controlled in response to the pressure in the condensing vapor zone. Thus, when the pressure in the condensing vapor zone increases, the aqueous terpene-lean condensate is subcooled to a lower temperature to reduce the pressure in the condensing vapor zone by condensing more vapors. Other conventional temperature or pressure operative control mechanisms can be employed if desired.

The distillate vapors from the boiling liquid zone are enriched in terpenes with respect to the residual liquid distilland in the boiling liquid zone in accordance with the laws of distillation. This flash distillation in effect strips 90 percent or more of the terpenes from the aqueous terpene-lean condensate, although only a minor proportion of the aqueous condensate flowing through the boiling liquid zone is actually flash vaporized. This proportion is usually about 5 to 50 percent and preferably about 10 to 25 percent by weight of the aqueous condensate flowing to the boiling liquid zone. Thus, the residual liquid distilland comprises 95 to 50 percent and preferably 90 to 75 percent of the aqueous condensate flowing to the boiling liquid zone.

The distillate vapors from the boiling liquid zone are withdrawn and compressed by a steam jet ejection or mechanical compression and are then condensed at a temperature below the dew point temperature of the terpene component to form a two-phase condensate having a terpene-to-water ratio suitable for separating by decantation. Such distillate vapors from the boiling liquid zone can be combined for condensation with the residual vapors from the condensing vapor zone.

The liquid distilland from the boiling liquid zone can be recycled through the boiling liquid zone one or more times to strip additional terpenes therefrom and more closely approach equilibrium.

The above and other objects features and advantages of the present invention will be more apparent from the following drawings wherein:

FIG. 1 is a schematic flow diagram illustrating a typical continuous woodpulp digestion process from which turpentine can be recovered from the relief vapors as illustrated in FIG. 2; and FIG. 2 is a schematic flow diagram illustrating the basis of design of a plant for recovering turpentine from the relief vapors from a woodpulp digestion process. FIG. 2 will be explained with references to Examples 1 and 2.

EXAMPLE 1

Referring now to FIG. 1, woodchips enter steaming vessel 10 where they are steamed at about 30 psia with flash vapors from flash drum 15 through stream 16 and supplemented by make-up steam at 30 psia through stream 13. Vent vapors from steaming vessel 10 are enriched in turpentine and leave steaming vessel 10 through stream 21 to recovery in FIG. 2. From steaming vessel 10 woodchips pass through stream 20 to continuous digester 11 where they are digested in alkaline cooking liquor to yield woodpulp at a pressure of about 180 psia at a temperature of about 350°F. Digested woodpulp leaves continuous digester 11 in stream 12 where it is filtered, washed and processed for recovery. The filtrate from the pulp washer also contains some residual turpentine extracted from the woodchips. The filtrate from the pulp washer contains turpentine and can be recycled for pulp washing as shown in FIG. 1. The vent vapors from the filtrate tank are rich in turpentine and can be passed through a vapor/liquid centrifugal separator for removal of the liquid from the vapor. The vapors can be partially condensed with cool water at 60° to 90°F. in the contact scrubber illustrated in FIG. 1 with the resulting condensate processed for recovery with stream 30 as shown in FIG. 2. The noncondensibles from the contact scrubber in FIG. 1 are processed for disposal.

Spent cooking liquor (or black liquor) from digester 11 at 180 psia passes through stream 14 to first flash drum 15 where the pressure is reduced to about 30 psia. The pressure reduction causes a flash distillation and the evolved vapors are enriched in turpentine in accordance with the principles of distillation. These vapors leave from flash drum 15 through stream 16 where they serve as the steam for steaming the woodchips in steaming vessel 10.

The liquid in the first flash drum 15 flows through stream 17 to a second flash drum 18 wherein the pressure is further reduced to about 17 psia. The liquid is flashed in flash drum 18 to produce vapors containing turpentine vapor and water vapor in accordance with the laws of distillation. The liquid from flash drum 18 is known as weak black liquor and passed for recovery in stream 19. The vapors from the second flash drum 18 in stream 22 are combined with stream 21 to form stream 30 for recovery of turpentine therefrom in accordance with FIG. 2.

Referring now to FIG. 2, stream 30 comprises 80,000 lbs. per hour of relief vapors at 218°F. and 17 psia. About 315 lbs. per hour of the 80,000 lbs. per hour are turpentine vapors. Neglecting mercaptans and other noncondensibles, the weight ratio of water to turpentine stream 30 is about 250 to 1. At this very low concentration, turpentine cannot be economically recovered by condensation and decantation.

Stream 30 comprises 80,000 lbs. per hour of vapor at 218°F. and 17 psia flows to the inlet port 41 of shell or condensing vapor zone 40 of the flash evaporator 33. Evaporator 33 is constructed of mild steel or other ordinary construction materials (.e.g, metals, ceramics, alloys, glass line metal and the like) which are compatible with the solids, liquids and gases being processed. The tubes in tube bundle 34 of evaporator 33 are constructed of type 304 stainless steel and are typically ¾ to 2 inches in diameter and 12 to 20 feet long. Liquid flows inside the tubes, and steam vapor condenses on the outside of the tubes in shell 40. The feed in the tubes flows through the tubes as a liquid receiving heat from the condensing steam. Bubbles then form in the liquid as boiling begins either in the tubes or in vapor dome 36 depending on whether or not back pressure is maintained on the liquid in the tubes. The mixture of vapor and liquid in vapor dome 36 is separated in a liquid component and a vapor component.

In shell 40 about 76,000 to 78,000 lbs. per hour of water vapor are condensed and cooled to a temperature of about 180°F. by indirect heat exchange with liquid into tube bundle 34. The 76,000 to 78,000 lbs. per hour of aqueous turpentine-lean condensate at 180°F. passes from shell 40 through outlet 42 through stream 43 to the suction of pump 46. The condensate in stream 43 can contain a small proportion of the turpentine that condenses after most of the water vapor has been condensed. This amount of condensed turpentine is typically about 15 to 65 lbs. per hour of the available 315 lbs. per hour. Thus, the residual 2,000 to 4,000 lbs. per hour of uncondensed vapor at 17 psia in shell 40 contains about 250 to 300 lbs. per hour of turpentine vapor together with an unknown proportion of noncondensibles. These residual uncondensed vapors pass from shell 40 through outlet 48 as stream 67 through partially open vent valve 52 and into stream 50 for recovery.

Condensate receiver 38 is vented to vapor dome 36 through vent line 73. Condensate receiver 38 is also adapted to receive liquid stream 44 which is substantially free of turpentine and emergency make-up water. Valves 60 and 62 can be set to recycle condensate from receiver 38 and cooling water from stream 61 in various proportions or condensate from condensate receiver 38 can be withdrawn as a composite in stream 63. From condensate receiver 38, a portion of the liquid then flows to heat recovery in an amount sufficient to accommodate the condensate resulting from the condensation of stream 30.

Liquid at the rate of 900,000 lbs. per hour at about 177°F. is pumped through stream 63 by pump 46 and into indirect heat exchanger 45 where the condensate is cooled to about 120°F. Stream 63 comprises stream 43 together with condensate from condensate receiver 38 and stream 71 in an amount sufficient to yield 900,000 lbs. per hour. Alternatively, as shown in FIG. 2, make-up cooling water can be fed directly to the suction of pump 46 through stream 61 to supplement stream 43. This flow rate is about 11 times the flow rate at which the aqueous turpentine-lean condensate is being collected from stream 43 so there is ample recycle of stream 43 to strip turpentine therefrom. The flow of coolant at about 90°F. to indirect heat exchanger 45 is controlled by control valve 64 which is operated by pressure controller 65. Pressure controller 65 is actuated when the maximum set point pressure of 17 psia is sensed by pressure probe 66 in shell 40. Pressure controller 65 opens to increase the cooling water flow and further lower the temperature of stream 63. This will have the effect of increasing the rate of condensation in shell 40 and thus lowering the pressure in shell 40 to at or below the set point of controller 65.

Stream 63 comprising 900,000 lbs. per hour of aqueous liquid at 120°F. passes from heat exchanger 45 through inlet 47 and into tube bundle 34 through header 35 where the pressure is maintained at about 10 to 11 psia. The liquid in tube bundle 34 is heated to boiling at about 195°F. at the 10 to 11 psia pressure and about 12,000 lbs. per hour (or about 13 percent by weight) of the liquid in tube bundle 34 are flashed vaporized by heat transfer with condensing vapors in shell 40.

The pressure in tube bundle 34 and vapor dome 36 is maintained at about 10 to 11 psia by steam jet ejector 49 so the boiling point of the liquid in tube bundle 34 is depressed to about 195°F. By this flash vaporization, about 90 percent of the residual turpentine in the liquid tube 34 is flash vaporized in accordance with the laws of distillation to yield a vapor phase enriched in turpentine and a turpentine-lean liquid distilland phase. The 12,000 lbs. per hour of flashed vapor fraction from tubes 34 pass into vapor dome 36. The 888,000 lbs. per hour of liquid distilland at 195°F. from tube bundle 34 passes through outlet 37 as stream 44 to condensate receiver 38 for recycle.

The 12,000 lbs. per hour of vapors at 10 to 11 psia containing about 15 to 65 lbs. per hour of turpentine vapor in vapor dome 36 are evacuated through outlet 59 and as stream 39 to a single stage steam jet ejector 49 where they are compressed to atmospheric pressure. The compressed vapors are then passed to stream 50 where they are combined with the uncondensed turpentine enriched vapors in stream 67. Combined stream 50 is at atmospheric pressure and about 200° to 210°F. and comprises about 16,000 lbs. per hour vapor containing about 315 lbs. per hour are turpentine, a small amount of steam from ejector 49. Stream 50 passes to indirect condenser 51, where the vapors are condensed and collected to form a two-phase condensate comprising a turpentine phase and an aqueous phase.

Indirect condenser 51 can be operated in the manner described in Ser. No. 751,425; and cooling water is circulated through indirect condenser 51 to condense liquid water and turpentine vapor to produce a two-phase liquid condensate. The two-phase liquid condensate flows from indirect condenser 51 through conduit 70 to decanter 53 for separation at 150°F. by density differential into a turpentine overflow phase comprising about 300 lbs. per hour and aqueous underflow phase comprising about 16,000 lbs. per hour. Aqueous underflow phase can be recycled with stream 63 or admixed with incoming vapors in stream 30 for further processing as shown in FIG. 2. Preferably, the phase separation in the decanter is accomplished at a temperature of about 125°F. to the boiling point of the condensate and more preferably at temperatures of 140° to 200°F. for efficient phase separation in accordance with U.S. Pat. No. 3,607,617.

Uncondensed vapors from heat exchanger 51 leave in conduit 68 and flow to scrubber 54 (alternatively, conduit 68 can be vented to the atmosphere when the condensation temperature is well below about 125°F.). Scrubber 54 is a conventional cold water scrubber comprising a column packed with Raschig rings or berl saddles where direct contact between vapors and cold water is effected. The water enters through stream 55 at 60° to 90°F. and is distributed over the top of the packing. Through direct contact the remaining turpentine vapors are condensed to a temperature within a few degrees of the temperature of the cooling water.

The liquid condensate from scrubber 54 can be returned to indirect condenser 51 through conduit 56 or flow directly to decanter 53 through conduit 57 by appropriate valve settings. Vent gases from the contact scrubber 74 are vented for disposal. By this method, about 300 lbs. per hour of the available 315 lbs. per hour of turpentine are recovered in the turpentine overflow. This is a recovery rate of about 95 percent by weight of the turpentine entering in stream 30.

EXAMPLE 2

In another typical embodiment of the present invention, the hourly flow rates are as follows:
Stream 30 at 17 psia and 218°F. comprises
90,000 lbs. water vapor
491 lbs. turpentine vapor
883 lbs. noncondensibles
Stream 43 comprises
110,500 lbs. water
69 lbs. turpentine
Stream 63 (including Stream 43) downstream of heat exchanger 45 at 120°F. comprises
1,000,000 lbs. water (at least a portion of which is make-up cooling water at 90°F. from Stream 61)
69 lbs. turpentine
Stream 44 at 10 to 11 psia and 195°F. comprises
98,500 lbs. liquid water < 0.01 lb. liquid turpentine
Stream 39 at 10 to 11 psia and 195°F. comprises
12,000 lbs. water vapor
69 lbs. turpentine vapor
Stream 67 comprises
4,000 lbs. water vapor
427 lbs. turpentine vapor
883 lbs. noncondensibles
Steam to ejector 49 comprises 6,500 lbs. of steam at 165 psia
Scrubbing water to scrubber 54 at 70°F. comprises 2,000 lbs. water
Noncondensible vented from scrubber 54 comprises
883 lbs. noncondensible
27 lbs. turpentine
Turpentine overflow at 150°F. comprises 464 lbs. turpentine (or 94+ percent recovery)
Aqueous underflow at 150°F. comprises
24,000 lbs. water
5 lbs. turpentine Similar results including a yield of 90+ percent are obtained when a wet, gaseous citrus limonene stream containing water and citrus limonene in the ratio of 260 parts of water to one part of citrus limonene are processed as stream 30 in FIG. 2 as in Example 1 to yield a limonene overflow phase and aqueous underflow phase from decanter 50.

Having thus described the invention, what is claimed is:

1. A process for recovery of terpenes from a gaseous stream containing water and terpenes in vapor phase and in a weight ratio of at least 50 to 500 parts of water to each part of terpenes, comprising the steps of:
   a. passing said gaseous stream through a zone in indirect heat exchange contact with a relatively cooler terpene-bearing coolant fluid introduced into said zone separately from said gaseous stream whereby (i) to condense from said gaseous stream a terpene-bearing condensate while yielding a first enriched terpene-bearing vapor phase of terpene concentration greater than both said gaseous stream and said condensate and (ii) to release heat to indirectly heat said terpene-bearing coolant fluid to distill therefrom a second enriched terpene-bearing vapor phase and to leave a liquid residue of relatively reduced terpene concentration, b. separating said first terpene-enriched vapor phase and said condensate from each other, c. separating said second terpene-enriched vapor phase from said liquid residue, d. combining said first and second enriched vapor phases at a location remote from said zone and out of contact with said condensate and said liquid residue, e. recovering terpenes from the combined vapor phases resulting from step (d), f. conducting said condensate formed in step (a) to a location remote from said zone and there cooling said condensate by indirect heat exchange to a temperature below that of said gaseous stream, and g. introducing substantially all of the resulting cooled condensate as the relatively cooler terpene-bearing coolant fluid introduced into said zone in step (a).

2. The process according to preceding claim 1 with the additional steps of conducting said liquid residue from step (a)(ii) to a location remote from said zone, cooling said liquid residue to a temperature below that of said gaseous stream and mixing at least part of the resulting cooled liquid residue with the relatively cooler terpene-bearing coolant fluid prior to indirect heat exchange contact of the latter with the gaseous stream in accordance with step (a).

* * * * *